J. S. RICKEL.
Seed Planter.
No. 62,888. Patented Mar. 12, 1867.
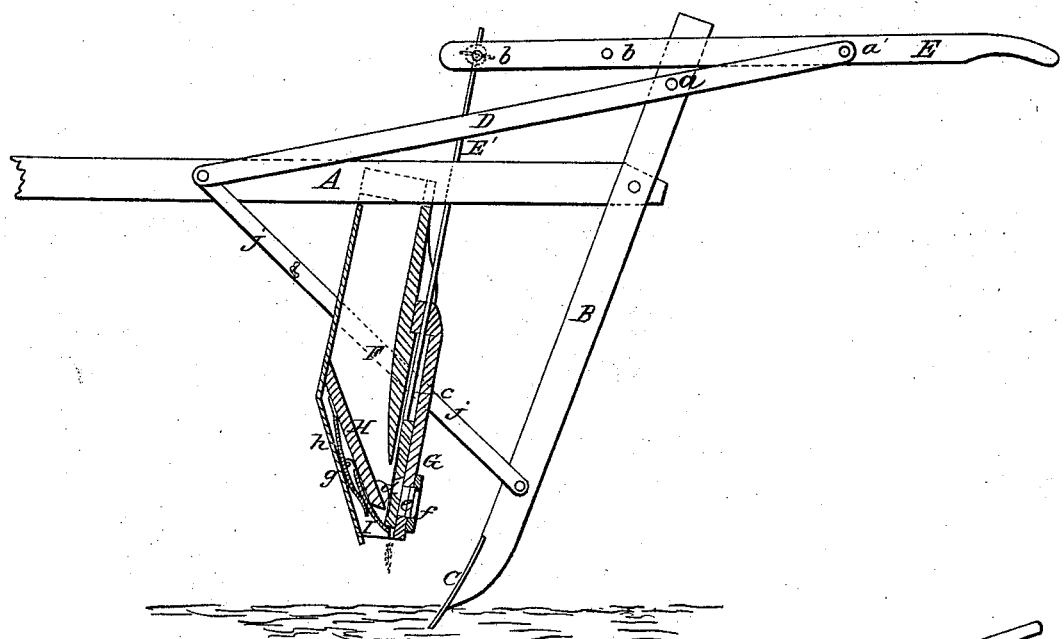
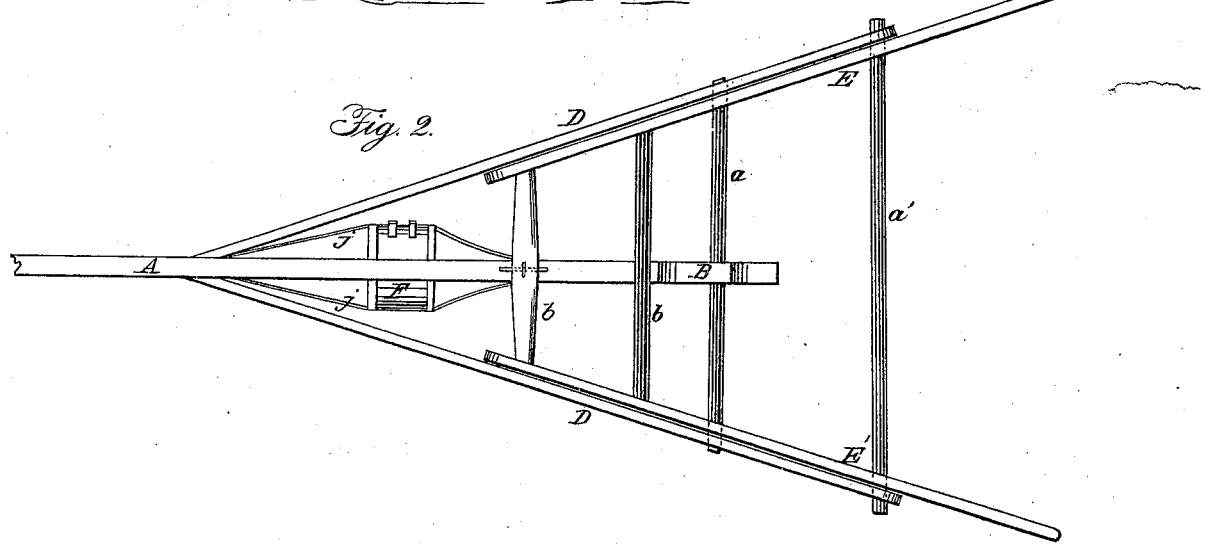
Witnesses:
Theo Tusch
J. A. Servica
Inventor:
Josiah S. Rickel
Per Munn & Co.
attys

United States Patent Office.

JOSIAH S. RICKEL, OF GENESEO, ILLINOIS.

Letters Patent No. 62,888, dated March 12, 1867.

IMPROVEMENT IN CORN PLANTER.

*The Schedule referred to in these Letters Patent and making part of the same.*

TO ALL WHOM IT MAY CONCERN:

Be it known that I, JOSIAH S. RICKEL, of Geneseo, in the county of Henry, and State of Illinois, have invented a new and improved Corn Planter; and I do hereby declare that the following is a full, clear, and exact description thereof, which will enable others skilled in the art to make and use the same, reference being had to the accompanying drawing, forming part of this specification, in which—

Figure 1 is a side view of my invention, the side of the seed-dropping tube nearest the eye being detached or removed in order to show the working parts.

Figure 2, a plan or top view of the same.

Similar letters of reference indicate like parts.

This invention relates to a new and improved corn planter, of that class which is operated by the driver as the machine is drawn along by one horse only, and the invention consists in a novel and improved construction of the working parts, as hereinafter fully shown and described, whereby the driver or operator has full control over the working parts so that the seed may be dropped evenly in check rows, and the driver allowed to see each dropping so that no hills can be missed or fail to have seed dropped into them.

A represents the beam of the device, having a standard, B, at its rear end, with a covering share, C, secured to its lower part. D D are bars secured at their front ends to the beam A, and connected by cross-rods $a\ a'$, one of which, $a$, passes through the upper end of the standard B, and the other, $a'$, having two levers or handles E E fitted upon it. These levers E E are allowed to work freely on the cross-rod $a'$, or the latter is allowed to turn or work in the bars D D. The levers are connected by cross-rods $b$, and the front cross-rod has a rod, $E'$, attached to it, which extends down into the rear part of a pendent tube F attached to beam A, (see fig. 1.) To the lower end of the rod $E'$, a slide, G, is connected, said slide working in a chamber, $c$, and having a hole, $d$, made through it to serve as a seed passage. In the lower rear part of the tube F there is made an opening $e$, covered by a glass, $f$. This opening serves as a seed receptacle. H is an inclined partition placed in the lower part of the tube F, and having a flap, I, attached to it by a hinge or joint, $g$. This flap has a spring, $h$, bearing against it, which spring has a tendency to keep the free or disengaged end of the flap pressed upward, as will be fully understood by referring to fig. 1. On the lower end of the partition H, there is a projection, $i$, of rubber or other yielding substance attached to serve as a cut-off, said projection pressing against the slide G.

The operation is as follows: The tube F is filled with corn, and the slide G is operated (raised up and down) by moving the levers or handles E E, which is done by the driver as the machine is drawn along. When the hole $d$ in the slide G comes opposite the opening $e$ fills with seed, and as the slide G is raised, the lower part of the same below hole $d$ covers said opening or cuts it off from the tube F above the lower end of the partition H, and at the same time permits the seed in $e$ to drop down below it, where it is caught and retained by the flap I, and at the succeeding depression of the slide the opening $e$ is allowed to fill with seed through hole $d$, and as the slide reaches the lowest point of its descent, it forces the corn which previously dropped from the opening $e$, and was caught and retained by flap I, out from the bottom of tube F. By this arrangement the corn is dropped from the lower end of tube F, quite near the surface of the ground, and at the exact spot, and as the slide G is forced down by raising the outer ends of the handles or levers E E, the share C will also be raised and the seed covered, not ploughed out, and a mound formed where the seed is deposited. The device is extremely simple and efficient, may be operated with facility, and the corn dropped in every hill with certainty, as the glass $f$ admits of the seed being seen and a failure of any dropping detected and remedied. I would remark that the hole $d$ in the slide G may be increased or diminished in capacity by means of a slide adjusted and retained in position by set-screws. By this arrangement the device is rendered very efficient and not liable to get out of repair. The slide G is thoroughly protected from the weather, and consequently is not liable to warp. The seed being dropped from the lower end of the tube F it is deposited with great accuracy at the desired spots, dropped just where required. The tube F is retained firmly in position by iron braces or bars $jj$ secured to the beam A and standard B. The rod $E'$ is made of iron, that being the preferable material, wood being liable to warp.

I claim as new, and desire to secure by Letters Patent—

The seed slide G, placed within a chamber, $c$, in the tube F, having a hole, $d$, made through it and operated by the levers or hands E E, in combination with the fixed partition H, provided with the elastic projection $i$, and flap I, and the recess $e$, with a glass, $f$, at its outer side, all arranged substantially as and for the purpose set forth.

JOSIAH S. RICKEL.

Witnesses:
J. S. FELGER,